Sept. 20, 1966     L. G. LANDES     3,274,452
DEGAUSSER
Filed March 12, 1963
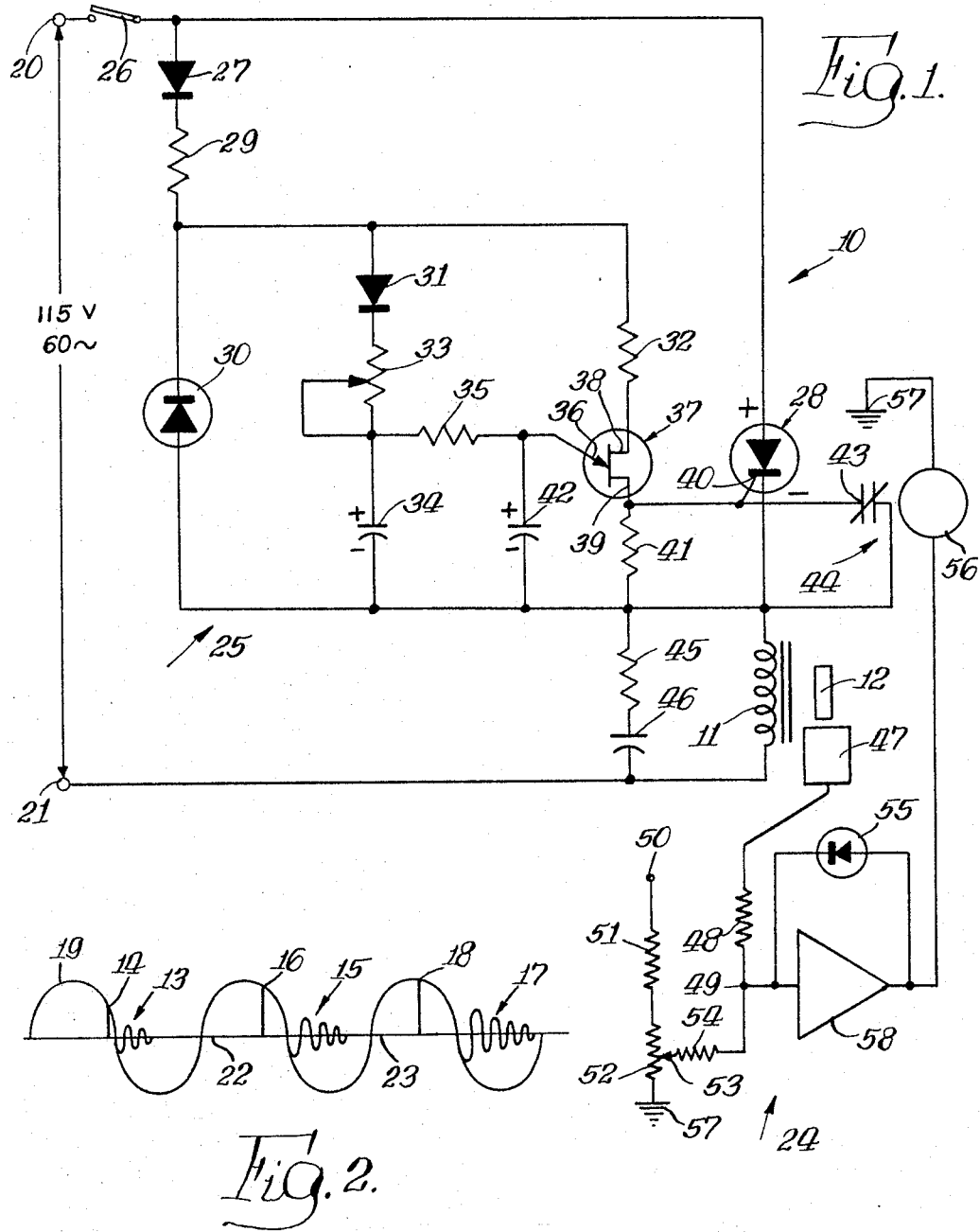
INVENTOR.
*Lewis G. Landes,*
BY
*Hofgren, Wegner, Allen,*
*Stellman & McCord Attys.*

United States Patent Office 3,274,452
Patented Sept. 20, 1966

3,274,452
DEGAUSSER
Lewis G. Landes, Wilmette, Ill., assignor to Barnes & Reinecke, Incorporated, a corporation of Delaware
Filed Mar. 12, 1963, Ser. No. 264,596
11 Claims. (Cl. 317—157.5)

This invention relates to degaussing apparatus and in particular to apparatus for controlledly degaussing magnetic elements to provide a preselected flux level therein.

One form of conventional degaussing apparatus utilizes the mechanical removal of the part to be degaussed from the field of an alternating current coil. Alternatively, the degaussing may be effected with such apparatus by slowly reducing the alternating current. In another form of known degaussing apparatus, a capacitor is charged from a direct current supply and connected to the degaussing coil through a suitable circuit to provide a damped oscillation current decaying to zero in a preselected short time. The above described apparatuses have the serious disadvantage of difficulty of obtaining preselected stabilized flux levels in the element being degaussed. To obtain such preselected values of stabilized flux in such elements, it has heretofore been necessary to effect the degaussing operation by providing curent pulses in the degaussing coil of ever-increasing amplitude and determining the flux value in the element after each degaussing pulse seriatim until the desired flux level is reached. Such a method has the obvious serious disadvantage of time consumption and relatively high cost.

The present invention comprehends an improved degaussing apparatus eliminating the above disadvantages of the known apparatuses. Thus, a principal feature of the present invention is the provision of a new improved degaussing apparatus.

Another feature of the invention is the provision of such apparatus providing automatic control of the degaussing of a magnetic element to obtain a preselected level of flux therein.

A further feature of the invention is the provision of such apparatus including new and improved means for providing in a degaussing coil element a degaussing current of ever-increasing amplitude sine wave pulses.

A further feature of the invention is the provision of such an apparatus wherein the degaussing current pulses are spaced by finite time intervals permitting discontinuation of the degaussing operation during any one of such intervals.

A yet further feature of the invention is the provision of such apparatus including means for sensing the mechanical flux condition of the element during each such time interval and including means for preventing delivery of further degaussing current through the degaussing coil when the flux level of the element reaches the preselected described flux level.

Still another feature of the invention is the provision of such an apparatus including a degausser element, means providing to the degausser element a degaussing current of seriatim increasing-amplitude damped sine wave pulses with a finite time interval between the pulses, and means for sensing the flux condition of a magnetic element disposed in degaussing association with said degausser coil, the sensing means including means for discontinuing the degaussing current when the element is degaussed to a preselected flux condition.

Other features and advantages of the invention will be apparent from the following description taken in connection with the accompanying drawing wherein:

FIGURE 1 is a schematic electrical wiring diagram of the control circuit of a degaussing apparatus embodying the invention; and FIGURE 2 is a graphic representation of the degaussing coil current as produced in the apparatus during a degaussing operation.

In the exemplary embodiment of the invention as disclosed in the drawing, a degaussing apparatus generally designated 10 is shown to comprise a degaussing coil 11 arranged to effect a desired degaussing of a magnetized element such as magnet 12. The apparatus 10 is arranged to effect the desired degaussing of element 12 by a controlled flow of current through the coil 11 so as to cause a resultant flux level to obtain in the magnet 12 with the magnet being disposed in fixed adjacent relationship to the coil.

More specifically, apparatus 10 causes a degaussing current to flow through the coil 11 which comprises ever-increasing-maximum-amplitude damped oscillating current pulses, as shown in FIGURE 2. Thus, the first pulse, generally designated 13, comprises a damped sine wave pulse having a maximum amplitude 14. The succeeding pulse 15 has an increased maximum amplitude 16 and the next succeeding pulse 17 has a further increased maximum amplitude 18. Each pulse, as shown, damps to substantially zero in a relatively short time, herein less than the one-half negative cycle of the applied A.C. power, as illustrated at 19 in FIGURE 2. In the illustrated embodiment as shown in FIGURE 1, the power supply may comprise a conventional 115 volt 60 cycle power supply having input terminals 20 and 21. With further reference to FIGURE 2, it should be noted that between the respective pulses, intervals 22 and 23, respectively, occur wherein substantially no current flows through coil 11.

The invention comprehends the utilization of the ever-increasing-maximum-amplitude damped current pulses in coil 11 to effect an automatic degaussing of magnetic element 12 to a preselected flux condition. Illustratively, the magnetic element 12 may comprise a magnet such as used in coin slot control devices wherein it is desired to have an accurate flux condition less than the saturated flux condition of the materials. Thus, the magnetic element 12 is first magnetized to a saturated condition and then disposed adjacent coil 11. Apparatus 10 is then operated to cause current pulses, such as shown in FIGURE 2, to pass through the coil 11 to effect seriatim increasing amounts of degaussing of the element 12 with each degaussing pulse separated by a quiescent interval. When the degaussing pulse having the desired maximum amplitude is provided in the coil 11 so as to reduce the magnetism in the element 12 to the preselected desired level, a circuit portion 24 of the apparatus 10 is actuated to discontinue automatically further current pulse delivery through the coil 11. Thus, the magnetic element 12 is automatically caused to have the desired flux condition and the operator need merely remove the element 12 from association with the coil 11 without further testing thereof.

Referring now more specifically to FIGURE 1, apparatus 10 is shown to comprise a circuit arrangement 25 connected to terminals 20 and 21 and to coil 11 for providing the above described current pulses to the coil. More specifically, the circuit arrangement 25 includes a normally open single pole initiate switch 26 connected from terminal 20 to a rectifier 27 and a voltage controlled rectifier 28 herein comprising a conventional silicon controlled rectifier. The rectifier 27 is connected through a resistor 29 to a clamping rectifier 30, a fourth rectifier 31, and a resistor 32. Rectifier 31 is connected through an adjustable resistor 33 to a relatively large capacity condenser 34 and a resistor 35. Resistor 35 is connected to the emitter 36 of a unijunction transistor 37, and resistor 32 is connected to base two 38 thereof. The base one 39 of the transistor 37 is connected to the gate 40 of the silicon controlled rectifier 28 and to a resistor 41. The emitter 36 is further connected to a condenser 42. Gate 40 of the silicon controlled rectifier is connected to a switch 43 herein comprising a set of normally open contacts of a relay generally designated 44. Each of rectifier 30, condensers 34 and 42, resistor 41, and contacts 43 are connected to a resistor 45 which in turn is connected through a condenser 46 to power supply terminal 21. The series circuit of the resistors 45 and 46 is connected in parallel with the coil 11.

Circuit 25 functions as follows. When the initiate switch 26 is closed, condenser 34 slowly charges through the rectifier 27, resistor 29, rectifier 31, and adjustable resistor 33. The reverse polarity rectifier 30 limits the voltage across rectifier 31, resistor 33, and condenser 34 to approximately 20 volts. Condenser 42 slowly charges until it reaches the emitter firing voltage, the rate of charging of condenser 42 being controlled by the resistor 35 and the voltage appearing across condenser 34.

When emitter 36 reaches its firing voltage, the unijunction transistor operates to provide a pulse of voltage to the gate 40 of the silicon controlled rectifier 28, thereby turning on the rectifier 28 for the balance of the one-half conductive cycle, herein the positive cycle of the alternating current power supply. A voltage is produced across the parallel circuit of resistor 45, condenser 46 and coil 11 causing a current flow through the coil 11 corresponding to the remaining portion of the conductive half cycle of the power supply voltage. When the power supply voltage goes negative, i.e. during the non-conducting half cycle thereof, the coil 11 and condenser 46 oscillate at their natural frequency with the resistor 45 effecting a damping of the resultant current so as to damp the current to approximately zero within a few cycles of oscillation. The above described functioning produces a current pulse through coil 11 corresponding to current pulse 13 of FIGURE 2. No further current is delivered through coil 11 for a period of time corresponding to inteval 22 until rectifier 28 again fires. As condenser 42 slowly builds up its charge, the firing of rectifier 28 occurs at a slightly earlier point in the next conducting half cycle of the power supply voltage, illustrated as pulse 15 of FIGURE 2. Thus the degaussing current produced in coil 11 is slightly greater in pulse 15 than in pulse 14 so that somewhat greater degaussing of the element 12 is effected by the second pulse.

As illustrated in FIGURE 2, the degaussing current pulses increase in their maximum amplitude seriatim. As indicated briefly above, when the degaussing of the element 12 is sufficient to cause the element 12 to have reached a preselected desired magnetic state, or flux condition, it is desirable to preclude further degaussing thereof. As further indicated briefly above, the circuit portion 24 is arranged to effect this desired discontinuation of the deguassing operation. More specifically, circuit portion 24 includes a conventional gaussmeter 47 such as those illustrated in the 1962 edition of the Electronic Buyers Guide, vol. 35–29A. Illustratively, the gaussmeter 47 may comprise the example gaussmeter P–224 therein. The gaussmeter is connected through a suitable resistor 48 to a summing junction 49. A regulated voltage input terminal 50 is connected through a resistor 51 to a variable potentiometer 52 having its movable contact 53 connected through a suitable resistor 54 to the summing junction 49. A direct current amplifier 58 such as shown in the 1963 Electronic Buyers Guide, vol. 35–29A, e.g. example P–374 therein, is connected to the summing junction. A zener diode 55 is connected across the amplifier 58 to clamp the output from the rectifier at about .6 volt during forward conduction thereof. The output of the rectifier is connected through a coil 56 of the relay 44 to the ground 57 comprising the opposite side of the power input 50.

Thus, the gaussmeter 47 may be disposed in flux sensing relationship with the element 12 so as to sense the flux condition thereof resulting from the degaussing operation of the apparatus 10. The potentiometer 52 is adjusted to the voltage level corresponding to the gaussmeter output of voltage for the preselected level of flux density of the element 12. Since the gaussmeter output voltage is greater than that provided by the potentiometer 52 at the summing junction 49, the summing junction will be positive thereby causing the output voltage from amplifier 58 to be negative. The amplifier 58 preferably is capable of producing a full output of 10 volts where the summing junction current is approximately $10^{-8}$ amperes. Such output voltage causes the coil 56 to open the normally closed switch 43 of relay 44 permitting the above described operation of the silicon controlled rectifier 28. However, when the element 12 has been degaussed to the preselected flux condition, the voltage produced by gaussmeter 47 will be equal to or less than the potentiometer voltage at the summing junction 49, thereby permitting the summing junction to swing negative, whereupon the amplifier 58 provides a positive output voltage to the coil 56 thereby permitting contacts 43 to close and short out the gate 40 of the silicon controlled rectifier 28. As the switch 43 has no control over the rectifier once it fires, the rectifier is automatically switched off after the complete pulse, that is during one of the intervals subsequent to a complete pulse, as shown in FIGURE 2, thereby assuring that the degaussing pulse is a complete sine wave of power damped to zero.

Illustratively, should the degaussing pulse 15 be sufficient to cause the flux condition of element 12 to be the preselected flux condition, the circuit portion 24, as described above, would operate to close switch 43 during the interval 23 thereby precluding further degaussing of the element 12, as such operation of switch 43 would preclude the initiation of the provision of pulse 17.

As a result, the element 12 is automatically brought to the desired flux condition simply by placing it in degaussing association with coil 11 and subsequently closing switch 26. The specific flux condition obtainable in element 12 is readily adjustable by adjustment of potentiometer 52. The apparatus 10 is extremely simple and economical yet provides a desirable function not heretofore provided in the art whereby automatic provision of flux condition in magnetic elements is obtained in a novel and simple manner.

In the exemplary embodiment disclosed herein, the circuit elements may be as follows:

| | |
|---|---|
| Rectifier 27 | Style 1N1694. |
| Rectifier 30 | Style 1N1527. |
| Rectifier 31 | Style 1N1694. |
| Silicon controlled rectifier 28 | Style 2N1849. |
| Zener diode 55 | Style 1N714. |
| Resistor 29 | 3.3K, 2 w. |
| Resistor 33 | 10K, ½ w. |
| Resistor 35 | 33K, ½ w. |
| Resistor 32 | 150 ohms. ½ w. |
| Resistor 41 | 47 ohms, ½ w. |
| Resistor 45 | 10 ohms.25 w. |
| Resistor 51 | 20K, ½ w. |
| Variable resistor 52 | 100 ohms. 1 w. |
| Resistor 54 | 20K, ½ w. |
| Resistor 48 | 20K, ½ w. |
| Condenser 34 | 250 mfd., 50 v. D.C. |
| Condenser 42 | .1 mfd., 50 v. D.C. |
| Condenser 46 | 10 mfd., 200 v. D.C. |

While I have shown and described one embodiment of my invention, it is to be understood that it is capable of many modifications. Changes, therefore, in the construction and arrangement may be made without departing from the spirit and scope of the invention as defined in the appended claims.

I claim:

1. Apparatus for controlledly degaussing a magnetic element, comprising: a degausser coil; means providing to said degausser coil a current of seriatim increasing-maximum-amplitude, damped oscillating current pulses; and means for sensing the flux condition of a magnetic element disposed in degaussing association with said degausser coil, said sensing means including means for discontinuing the degaussing current when the element is degaussed to a preselected flux condition.

2. The apparatus of claim 1 where said current providing means is arranged to provide damped sine wave pulses.

3. Apparatus for controlledly degaussing a magnetic element, comprising: a degausser coil; means providing to said degausser coil a current of seriatim increasing-maximum-amplitude, damped sine wave pulses with a finite time interval between said pulses; and means for sensing during each said interval the flux condition of a magnetic element disposed in degaussing association with said degausser coil, said sensing means including means for preventing further delivery of degaussing current to said coil when the element is degaussed to a preselected flux condition.

4. The apparatus of claim 3 wherein said time interval subsequent to each pulse is proportioned to the maximum amplitude of that pulse.

5. Apparatus for controlledly degaussing a magnetic element, comprising: a degausser coil; and means for providing in said degausser coil a current of seriatim increasing-maximum-amplitude, damped sine wave pulses with a finite time interval between said pulses.

6. Apparatus for controlledly degaussing a magnetic element, comprising: a degausser coil; means for providing to said degausser element a current of seriatim increasing-maximum-amplitude, damped since wave pulses with a finite time interval between said pulses, said means including a half wave rectifier having a control element operable as a function of a voltage applied thereto to vary the time of firing of the rectifier during each conductive half cycle of an alternating current voltage applied thereto, a capacitor in parallel with said degaussing coil; means connecting said rectifier in series with the paralleled capacitor and coil; means providing a voltage to said control element for permitting current flow through said rectifier to said paralleled capacitor and coil, said capacitor and coil producing an oscillating current therebetween during the subsequent non-conducting half cycle of the applied voltage; and a resistor connected between said capacitor and coil for damping the oscillating current.

7. The apparatus of claim 6 wherein said rectifier comprises a silicon controlled rectifier.

8. The apparatus of claim 6 wherein said voltage providing means is arranged to provide said voltage for firing said rectifier seriatim earlier each conducting half cycle.

9. The apparatus of claim 6 wherein said voltage providing means includes a unijunction transistor and a resistor-capacitor circuit for firing the emitter seriatim earlier each conducting half cycle, one base of said transistor being connected to said control element of the rectifier.

10. Apparatus for controlledly degaussing a magnetic element, comprising: a degausser coil; means for providing to said degausser element a current of seriatim increasing-maximum-amplitude, damped sine wave pulses with a finite time interval between said pulses, said means including a half wave rectifier having a control element operable as a function of a voltage applied thereto to vary the time of firing of the rectifier during each conductive half cycle of an alternating current voltage applied thereto, a capacitor in parallel with said degaussing coil; means connecting said rectifier in series with the paralleled capacitor and coil; means providing a voltage to said control element for permitting current flow through said rectifier to said paralleled capacitor and coil, said capacitor and coil producing an oscillating current there between during the subsequent non-conducting half cycle of the applied voltage; a resistor connected between said capacitor and coil for damping the oscillating current; and means for selectively precluding the provision of said firing voltage to said control element.

11. The apparatus of claim 10 wherein said precluding means comprises a switch selectively shorting out the control element voltage.

References Cited by the Examiner
UNITED STATES PATENTS

| | | | |
|---|---|---|---|
| 3,080,507 | 3/1963 | Wickerham et al. | 317—123 |
| 3,093,774 | 6/1963 | Christianson et al. | 317—157.5 |
| 3,164,753 | 1/1965 | Schroeder | 317—157.5 XR |

MILTON O. HIRSHFIELD, *Primary Examiner.*

SAMUEL BERNSTEIN, *Examiner.*

D. YUSKO, J. SIVERMAN, *Assistant Examiners.*